US010871928B2

(12) United States Patent
Otake et al.

(10) Patent No.: US 10,871,928 B2
(45) Date of Patent: Dec. 22, 2020

(54) INFORMATION TERMINAL WITH A CALLING UNIT CONFIGURED TO ENABLE COMMUNICATION WITH ANOTHER INFORMATION TERMINAL, IMAGE PROCESSING SYSTEM, AND PROGRAM

(71) Applicant: KONICA MINOLTA, INC., Tokyo (JP)

(72) Inventors: Toshihiko Otake, Ikeda (JP); Kazumi Sawayanagi, Itami (JP); Hisashi Uchida, Kyoto (JP); Hidetaka Iwai, Itami (JP); Yosuke Taniguchi, Osaka (JP); Toshikazu Kawaguchi, Kobe (JP); Hideaki Soejima, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/433,118

(22) Filed: Feb. 15, 2017

(65) Prior Publication Data
US 2017/0249114 A1    Aug. 31, 2017

(30) Foreign Application Priority Data
Feb. 25, 2016   (JP) .................... 2016-034503

(51) Int. Cl.
*G06F 3/12* (2006.01)
*H04N 1/00* (2006.01)
(Continued)

(52) U.S. Cl.
CPC .......... *G06F 3/1236* (2013.01); *G06F 3/1204* (2013.01); *G06F 3/1268* (2013.01);
(Continued)

(58) Field of Classification Search
None
See application file for complete search history.

(56) References Cited

U.S. PATENT DOCUMENTS

2002/0095506 A1* 7/2002 Tanimoto ............... H04N 1/324
                                                      709/227
2006/0050310 A1* 3/2006 Ito ....................... H04N 1/32502
                                                      358/1.15
(Continued)

FOREIGN PATENT DOCUMENTS

JP      2004-246472 A    9/2004
JP      2007-019660 A    1/2007
(Continued)

OTHER PUBLICATIONS

Machine Translation in English of JP2009-100191 to Masuda Yoshihiro (cited in IDS).*

(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

An information terminal includes: a communication unit; and a control unit configured to control the communication unit, wherein the control unit is configured to establish a communication channel with another terminal by using the communication unit, and the communication unit is configured to receive device information containing an address of an image processing device positioned on the periphery of the another terminal, and transmit the device information of the image processing device positioned on the periphery of the another terminal to an image processing device positioned on the periphery of the information terminal.

14 Claims, 13 Drawing Sheets

(51) Int. Cl.
*H04N 1/32* (2006.01)
*H04W 12/00* (2009.01)

(52) U.S. Cl.
CPC ....... *G06F 3/1292* (2013.01); *H04N 1/00307* (2013.01); *H04N 1/32502* (2013.01); *H04N 1/32507* (2013.01); *H04N 1/32523* (2013.01); *H04N 1/32539* (2013.01); *H04N 1/32545* (2013.01); *G06F 3/1238* (2013.01); *H04N 2201/0094* (2013.01); *H04W 12/0051* (2019.01)

(56) References Cited

U.S. PATENT DOCUMENTS

| | | | |
|---|---|---|---|
| 2006/0089133 | A1 | 4/2006 | Yoshizawa et al. |
| 2006/0250643 | A1* | 11/2006 | Matsumoto ........... G06F 3/1204 358/1.15 |
| 2013/0332706 | A1* | 12/2013 | Tanaka .................. G06F 13/385 712/220 |
| 2017/0192727 | A1* | 7/2017 | Yun ....................... G06F 3/1296 |

FOREIGN PATENT DOCUMENTS

| | | |
|---|---|---|
| JP | 2009-100191 A | 5/2009 |
| JP | 2012-085086 A | 4/2012 |
| JP | 2013-109733 A | 6/2013 |
| JP | 2015-023342 A | 2/2015 |

OTHER PUBLICATIONS

Notice of Reasons for Rejection issued in corresponding Japanese Patent Application No. 2016-034503, dated Aug. 20, 2019 (8 pages).
Notice of Reasons for Rejection issued in corresponding Chinese Patent Application No. 201710092435.7, dated Jun. 20, 2019 (17 pages).
Office Action issued in corresponding Chinese Patent Application No. 201710092435.7, dated Jan. 22, 2020 (14 pages).

* cited by examiner

INFORMATION TERMINAL WITH A CALLING UNIT CONFIGURED TO ENABLE COMMUNICATION WITH ANOTHER INFORMATION TERMINAL, IMAGE PROCESSING SYSTEM, AND PROGRAM

The entire disclosure of Japanese Patent Application No. 2016-034503 filed on Feb. 25, 2016 including description, claims, drawings, and abstract are incorporated herein by reference in its entirety.

BACKGROUND OF THE INVENTION

Field of the Invention

The present disclosure relates to an information terminal, an image processing system, and a program and particularly relates to an information terminal having a function of making/receiving a call to/from another terminal, an image processing system including the information terminal, and a program executed in the information terminal.

Description of the Related Art

Regarding a method in which an image processing device such as an MFP (Multi-Functional Peripheral) communicates with an information terminal, various techniques have conventionally been proposed. For example, JP 2007-019660 A discloses a data processing system that registers a method of processing an address of a user and data associated with the address in an MFP (Multi-Functional Peripheral) and, when data is registered in the MFP, processes the data with a method associated with an address designated for the data.

JP 2012-085086 A discloses a method in which an image processing device (printing device) including a wireless communication device searches a device serving as a candidate to be connected. JP 2004-246472 A discloses a method in which an image processing device (printer) prints data accumulated in a file server in another network. JP 2015-023342 A discloses a technique in which an information terminal searches an image processing device positioned in the vicinity of (in the same room as) the information terminal. JP 2013-109733 A discloses a technique in which an information terminal searches an image processing device (printing device) positioned within a certain distance.

Some recent information terminals have an application for making/receiving a call to/from another information terminal. When a user is talking by using an information terminal with a user of another information terminal, the user requests the user of the another information terminal to transmit a document in some cases. In such a case, the user needs to perform complicated operation. That is, for example, the user generates data by scanning a document with the use of an image formation device, transmits the data from the image formation device to the information terminal, and transmits the data from the information terminal to the terminal of the other party.

Meanwhile, in the terminal of the other party, it is normally difficult for the user to read a document of the above data while maintaining a call even in a case where the terminal receives the above data. The user normally needs to interrupt the call in order to read the document. For example, when the terminal receives the above data, the user interrupts a call once, transmits the data from the terminal to an image processing device, causes the image processing device to output the document, and then makes a call to talk with the other party again.

SUMMARY OF THE INVENTION

The present disclosure has been made in view of such circumstances, and an object thereof is to, when a user is on a call by using an information terminal, allow the user to transmit data and read transmitted data without interrupting the call.

To achieve the abovementioned object, according to an aspect, an information terminal reflecting one aspect of the present invention comprises: a communication unit; and a control unit configured to control the communication unit, wherein the control unit is configured to establish a communication channel with another terminal by using the communication unit, and the communication unit is configured to receive device information containing an address of an image processing device positioned on the periphery of the another terminal, and transmit the device information of the image processing device positioned on the periphery of the another terminal to an image processing device positioned on the periphery of the information terminal.

The communication unit is preferably configured to receive the device information from the image processing device positioned on the periphery of the information terminal and transmit, to the another terminal, the device information of the image processing device positioned on the periphery of the information terminal, and is preferably configured to transmit, to the another terminal, the device information of the image processing device positioned on the periphery of the information terminal when the communication channel with the another terminal is established.

The communication unit is preferably configured to, upon receipt of the device information of a plurality of image processing devices from the another terminal, transmit the device information of the plurality of image processing devices and the order of priority of the plurality of image processing devices to the image processing device positioned on the periphery of the information terminal, and the order of priority is preferably based on at least one of a distance between the another terminal and each image processing device and a usage frequency of each image processing device associated with the another terminal.

The control unit is preferably configured to detect that the information terminal or a target associated with the information terminal is positioned on the periphery of a first image processing device or the target associated with the information terminal has operated the first image processing device, and the communication unit is preferably configured to, in a case where the control unit detects that the information terminal or the target associated with the information terminal is positioned on the periphery of the first image processing device or the target associated with the information terminal has operated the first image processing device, transmit the device information of the image processing device positioned on the periphery of the another terminal to the first image processing device.

The information terminal preferably further comprises an operation unit configured to accept input, and the control unit is preferably configured to, in a case where an instruction to transfer device information is input to the operation unit, transmit the device information of the image processing device positioned on the periphery of the information terminal to the another terminal.

To achieve the abovementioned object, according to an aspect, an image processing system reflecting one aspect of the present invention comprises: an information terminal; and a first image processing device positioned on the periphery of the information terminal, wherein the information terminal includes a communication unit and a control unit configured to control the communication unit, the control unit is configured to establish a communication channel with another terminal by using the communication unit, and the communication unit is configured to receive device information containing an address of a second image processing device positioned on the periphery of the another terminal, and transmit the device information of the second image processing device to the first image processing device.

The device information preferably contains information for specifying the kind of data treated by the second image processing device, the first image processing device preferably further includes an input unit configured to accept input, and a transmission unit configured to, in a case where the input unit accepts an instruction to transmit data to the image processing device and the kind of data to be transmitted is not included in the kind of data treated by the second image processing device, transmit, to the information terminal, an instruction to convert the data to be transmitted in response to the instruction into the kind of data treated by the second image processing device and then transmit the data to the second image processing device.

The second image processing device preferably includes a plurality of image processing devices, the device information preferably contains the kind and the order of priority of data treated by the plurality of image processing devices, the first image processing device preferably includes a generation unit configured to generate data of an image, a display unit configured to display the plurality of image processing devices as candidates of a transmission destination of the data generated by the generation unit, and an adjustment unit configured to adjust the order of priority of the plurality of image processing devices, and the adjustment unit is preferably configured to adjust the order of priority of the plurality of image processing devices so that the second image processing device corresponding to the device information that does not contain the kind of data generated by the generation unit has a lower priority than the second image processing device corresponding to the device information that contains the kind of data generated by the generation unit.

To achieve the abovementioned object, according to an aspect, there is provided a non-transitory recording medium storing a computer readable program executed by a computer of an information terminal including a communication unit, and the program reflecting one aspect of the present invention causes the computer to execute: a step of establishing a communication channel with another terminal by using the communication unit; a step of receiving device information containing an address of an image processing device positioned on the periphery of the another terminal; and a step of transmitting the device information of the image processing device positioned on the periphery of the another terminal to an image processing device positioned on the periphery of the information terminal.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of an information terminal and an image processing system including the information terminal will be described with reference to the drawings. However, the scope of the invention is not limited to the illustrated examples. In the following description, the same components and constituent elements are denoted by the same reference signs. Names and functions thereof are also the same. Therefore, description thereof will not be repeated.

First Embodiment

<1. Outline of Image Processing System>

Figure 1:
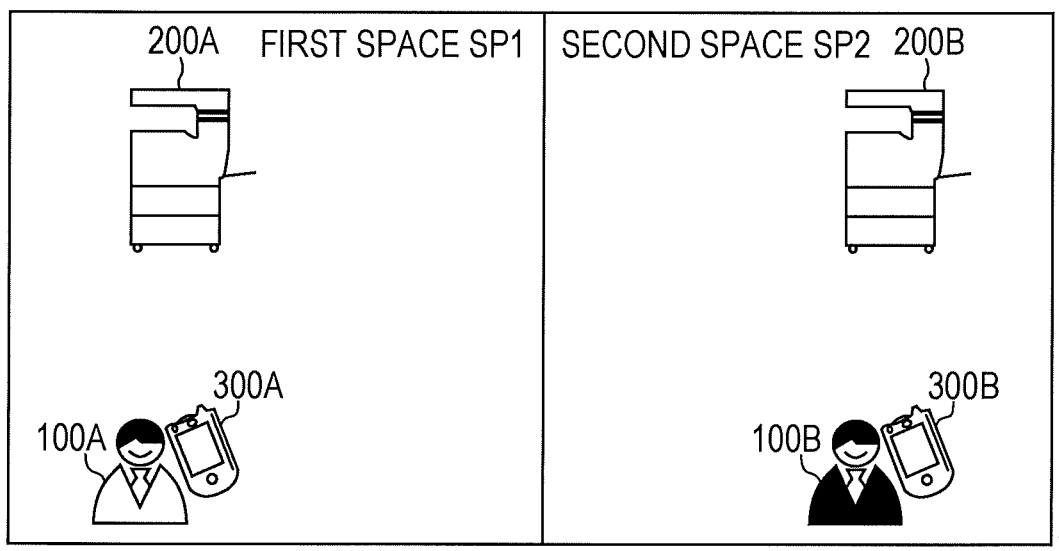
FIG. 1 shows an example of a schematic configuration of an image processing system.

FIG. 1 shows an example of a schematic configuration of an image processing system. In the image processing system in FIG. 1, in a case where a first information terminal 300A has established a communication channel with a second information terminal 300B, the first information terminal 300A transmits, to the second information terminal 300B, MFP information containing an address of a first MFP 200A positioned on the periphery of the first information terminal 300A. The second information terminal 300B transfers the MFP information received from the first information terminal 300A to a second MFP 200B positioned on the periphery of the second information terminal 300B.

With this, for example, during a call between a first user 100A who uses the first information terminal 300A and a second user 100B who uses the second information terminal 300B, the first user 100A receives, via the first MFP 200A, data transmitted by the second user 100B via the second MFP 200B.

Hereinafter, processing executed in the image processing system in FIG. 1 will be described more specifically.

In the image processing system, the first user 100A, the first information terminal 300A, and the first MFP 200A are positioned in a first space SP1. The first user 100A uses the first information terminal 300A, and the first MFP 200A is positioned on the periphery of the first information terminal 300A.

An example of "positioned on the periphery of" is "establishing short-range communication such as Bluetooth (registered trademark)". Another example thereof is "being positioned within a distance determined in advance". Still another example thereof is "being registered in the first information terminal 300A as a device 'positioned on the periphery of' the first information terminal 300A".

The second user 100B, the second information terminal 300B, and the second MFP 200B are positioned in a second space SP2. The second user 100B uses the second information terminal 300B, and the second MFP 200B is positioned on the periphery of the second information terminal 300B.

In this specification, the first MFP 200A and the second MFP 200B are also generally referred to as "MFP 200" when a configuration common to the first MFP 200A and the second MFP 200B is mentioned. The first information terminal 300A and the second information terminal 300B are also generally referred to as "information terminal 300" when a configuration common to the first information terminal 300A and the second information terminal 300B is mentioned.

Figure 2:
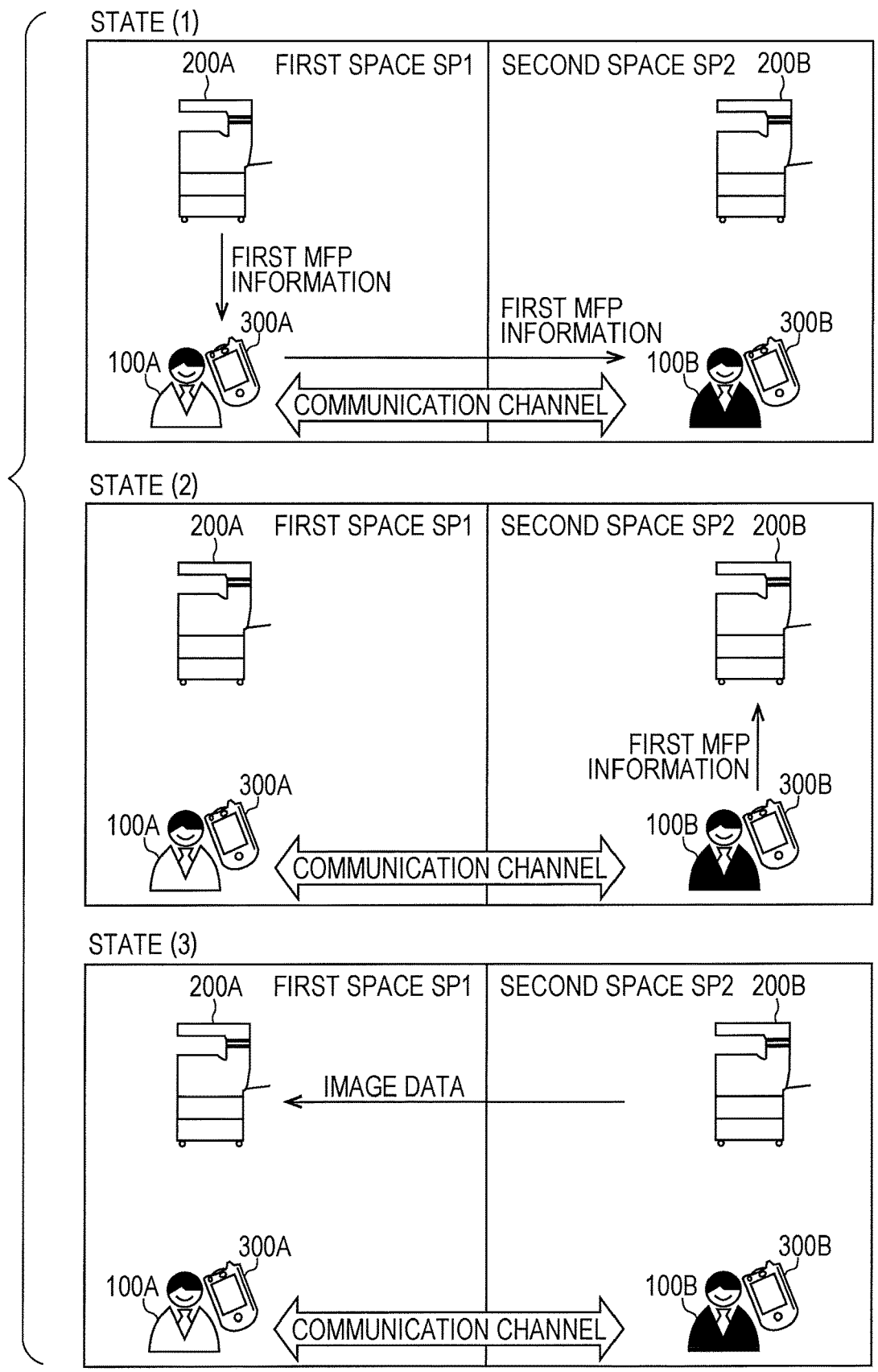
FIG. 2 schematically shows an example of operation of an image processing system according to a first embodiment.

FIG. 2 is a diagram for explaining the processing executed in the image processing system in FIG. 1 more specifically. FIG. 2 schematically shows an example of operation of each element in the image processing system in FIG. 1 as a state (1) to a state (3). As shown in the state (1) in FIG. 2, the first information terminal 300A receives MFP information that is information on the first MFP 200A from the first MFP 200A via, for example, wireless communication during a call with the second information terminal 300B. The MFP information contains an address of the MFP (for example, IP (Internet Protocol) address). Thereafter, the first information terminal 300A transmits the MFP information of the first MFP 200A to the second information terminal 300B during the call. Hereinafter, the MFP information of the first MFP 200A is referred to as "first MFP information".

Upon receipt of the first MFP information from the first information terminal 300A, the second information terminal 300B transfers the first MFP information to the second MFP 200B as shown in the state (2). The second MFP 200B is positioned on the periphery of the second information terminal 300B. The second information terminal 300B transmits the first MFP information to the second MFP 200B via, for example, wireless communication.

As shown in the state (3), the second user 100B instructs the second MFP 200B to transmit data. In the state (2), the second MFP 200B has acquired the address of the first MFP 200A as the first MFP information. Therefore, the second user 100B can transmit the data to the first MFP 200A by using the second MFP 200B.

Figure 3:
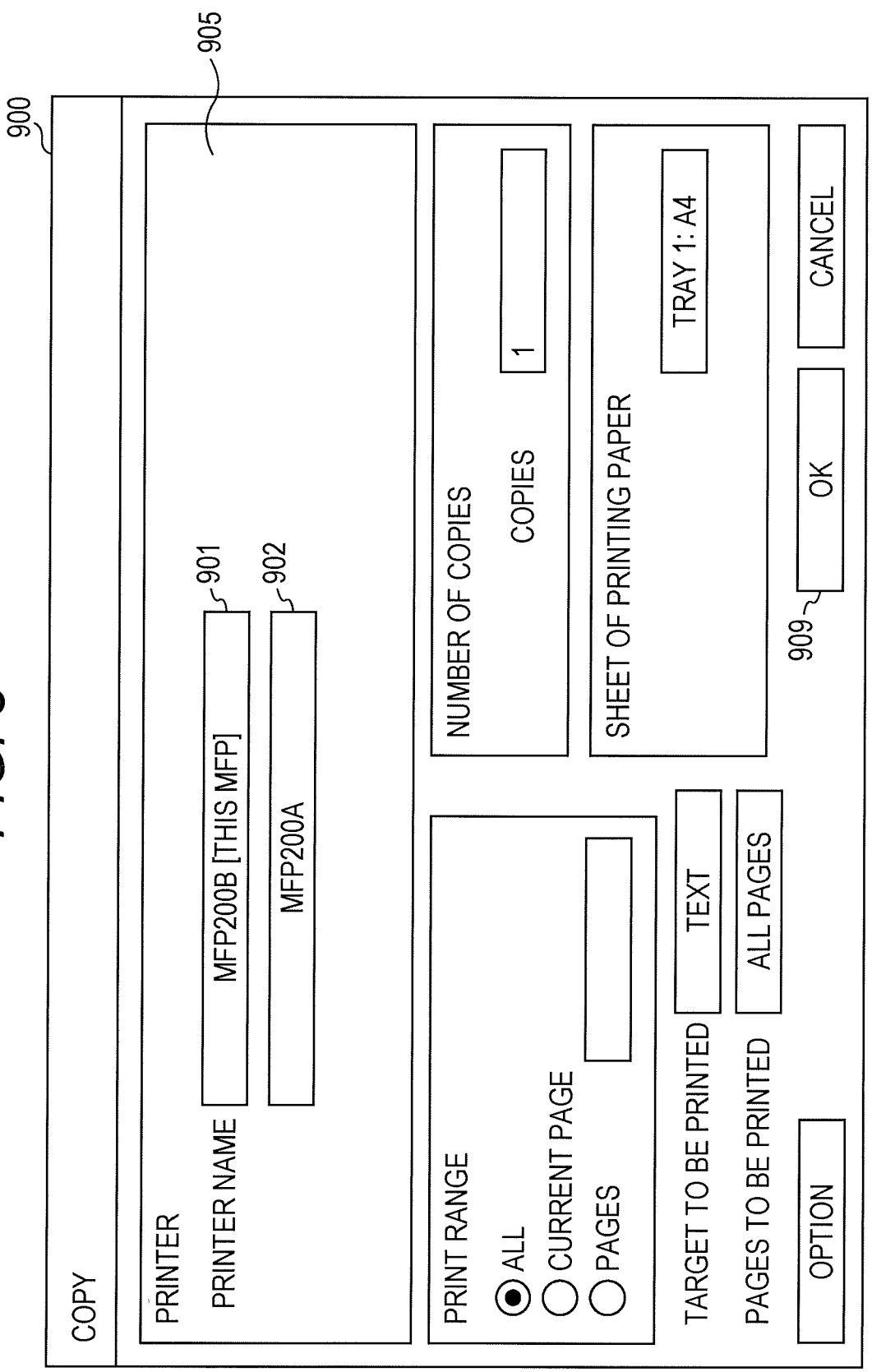
FIG. 3 shows an example of a screen displayed by a second MFP according to the first embodiment.

Transmission of data from the second MFP 200B to the first MFP 200A will be described more specifically with reference to FIG. 3. FIG. 3 shows an example of a screen displayed by the second MFP 200B of the first embodiment.

For example, the second MFP 200B displays a screen 900 in FIG. 3 when the second MFP 200B is instructed to copy a manuscript. The screen 900 includes a display section 905 for accepting designation of an output destination of a copied image. The display section 905 displays a button 901 indicating "MFP 200B" and a button 902 indicating "MFP 200A" as candidates of the output destination. The button 901 indicates the MFP 200B itself that displays the button 901. Therefore, the button 901 includes a character string "This MFP".

When the first MFP 200A is designated as the output destination and an OK button 909 is operated thereafter, the second MFP 200B generates image data by scanning the set manuscript. Thereafter, the second MFP 200B transmits the generated data to the first MFP 200A.

<2. Hardware Configuration of MFP 200>

Figure 4:
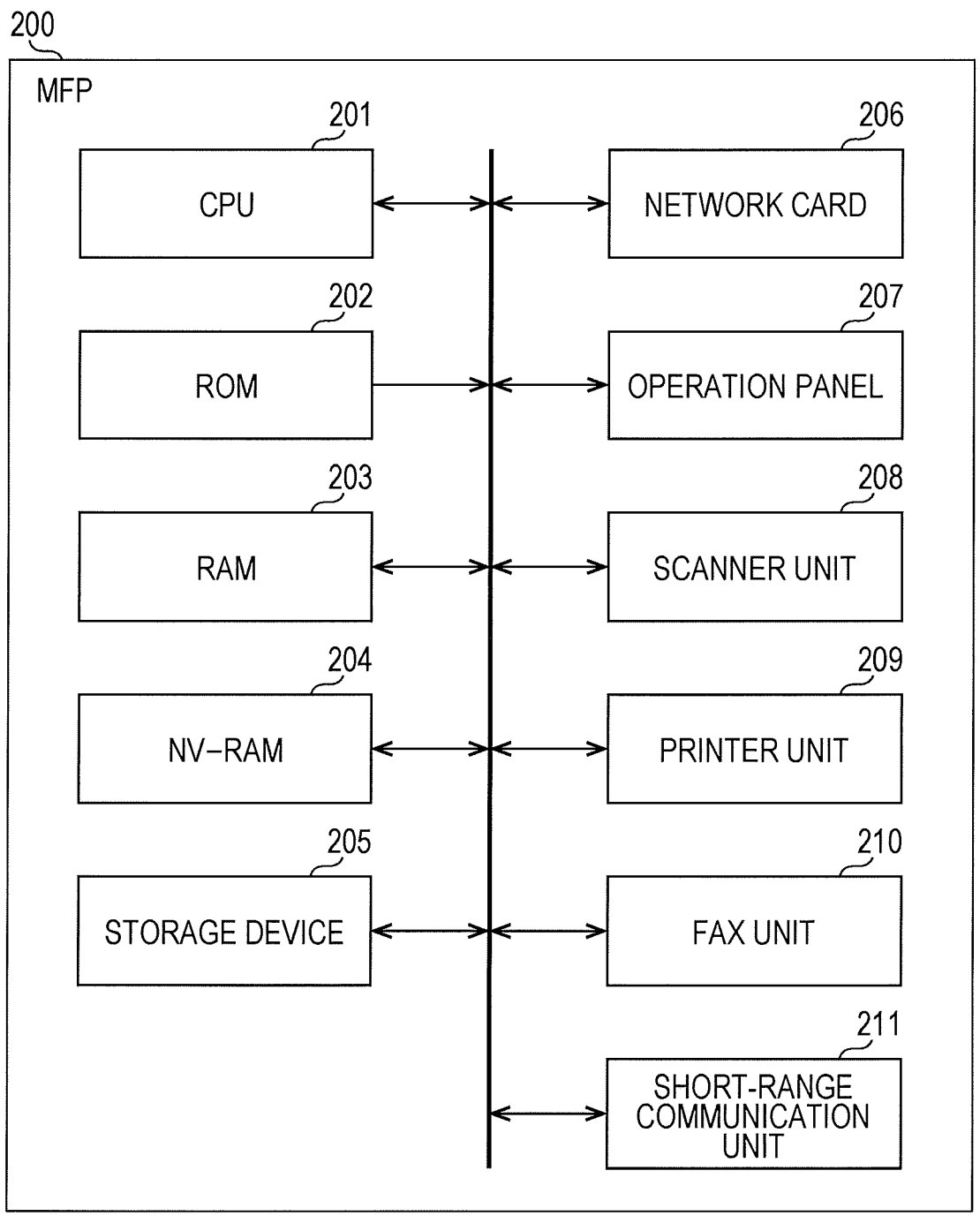
FIG. 4 shows a hardware configuration of an MFP (MFP and general term for MFP)

FIG. 4 shows a hardware configuration of the MFP 200 (general term for MFP 200A and MFP 200B). As shown in FIG. 4, the MFP 200 includes, as main constituent elements, a CPU 201, a ROM (Read Only Memory) 202, a RAM (Random Access Memory) 203, an NV (Non-Volatile)-RAM 204, a storage device 205, a network card 206, an operation panel 207, a scanner unit 208, a printer unit 209, a facsimile (FAX) unit 210, and a short-range communication unit 211. The elements in the MFP 200 are connected to one another via an internal bus.

The CPU 201 is an example of a processor that executes processing for integrally controlling operation of the MFP 200. In this specification, content of control realized by the CPU 201 executing a given program can be written as control executed by the MFP 200.

The ROM 202 stores various kinds of data and/or programs executed by the CPU 201.

The RAM 203 and the NV-RAM 204 function as work areas when a program is executed in the CPU 201. The RAM 203 and/or the NV-RAM 204 temporarily store(s), for example, image data read by the scanner unit 208 in some cases.

The storage device 205 stores various kinds of data such as address information and documents registered in the MFP 200. Data of a document is input to the MFP 200 via a network in some cases or is generated by reading an image in the scanner unit 208 in some cases.

The network card 206 is an example of a communication interface used when the MFP 200 is connected to a network (for example, LAN (Local Area Network)) in order to communicate with another apparatus.

The operation panel 207 accepts input operation of information such as setting of an image quality of data to be generated, setting of a sheet of paper to be output, and registration and selection of a transmission destination of the generated data. For example, a liquid crystal display unit on which a touchscreen is laminated is provided on a surface of the operation panel 207. The operation panel 207 displays, for example, content of setting in the MFP 200.

The scanner unit 208 scans a set manuscript and generates image data (also simply referred to as "data") of the manuscript.

The printer unit 209 forms an image corresponding to data on a sheet of printing paper with, for example, an electrographic method. The printer unit 209 forms an image on a sheet of printing paper with, for example, toner.

The FAX unit 210 transmits/receives image data via facsimile communication.

The short-range communication unit 211 is an interface via which the MFP 200 wirelessly communicates with another apparatus in accordance with a standard such as Bluetooth (registered trademark).

In the MFP 200, a program executed by the CPU 201 may be stored on the storage device 205 or may be stored on a storage medium detachable from the MFP 200, instead of being stored on the ROM 202 as described above. A storage medium on which the program is stored stores data in a non-volatile manner. The storage medium is, for example, a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (other than memory card), an optical card, a mask ROM, an EPROM, or an EEPROM (Electronically Erasable Programmable Read-Only Memory).

<3. Hardware Configuration of Information Terminal 300>

Figure 5:
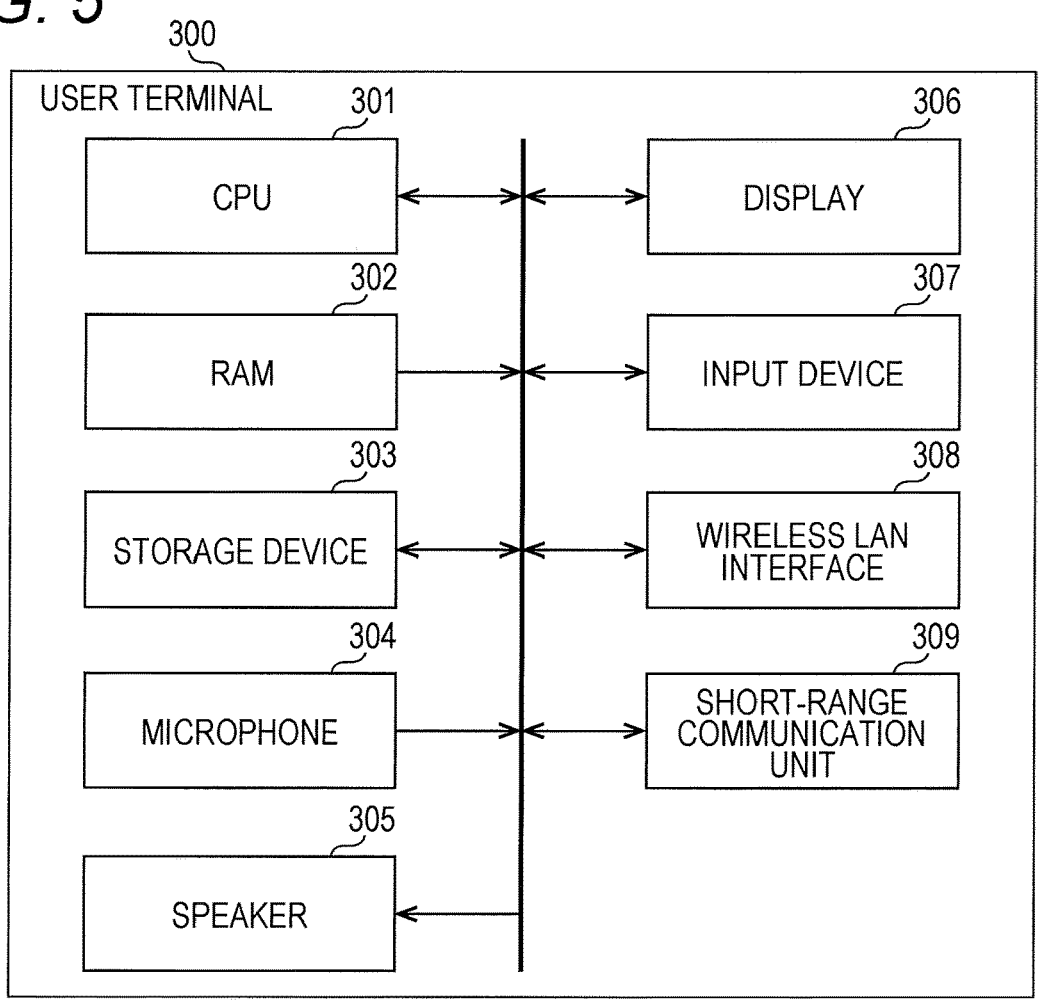
FIG. 5 shows an example of a hardware configuration of an information terminal.

FIG. 5 shows an example of a hardware configuration of the information terminal 300.

As shown in FIG. 5, the information terminal 300 includes, as main constituent elements, a CPU 301, a RAM 302, a storage device 303, a microphone 304, a speaker 305, a display 306, an input device 307, a wireless LAN interface 308, and a short-range communication unit 309. The elements in the information terminal 300 are connected to one another via an internal bus.

The CPU 301 is an example of a processor that executes processing for controlling the whole operation of the information terminal 300. In this specification, content of control realized by the CPU 301 executing a given program can be written as control executed by the information terminal 300.

The RAM 302 functions as a work area when processing is executed in the CPU 301.

The storage device 303 stores, in a non-volatile manner, various kinds of programs such as an OS (Operation System) executed by the CPU 301 and a browser application and various kinds of data used for executing the programs. The storage device 303 is, for example, a CD-ROM, a DVD-ROM, a USB memory, a memory card, an FD, a hard disk, an SSD, a magnetic tape, a cassette tape, an MO, an MD, an IC card (other than memory card), an optical card, a mask ROM, an EPROM, or an EEPROM. A program downloaded via a network can also be installed in the storage device 303.

The microphone 304 outputs input sound to the CPU 301.

The speaker 305 outputs sound in accordance with an instruction from the CPU 301.

The display 306 displays an image showing a processing result of a program executed by the CPU 301.

The input device 307 accepts input operation. The input device 307 is, for example, a hardware button and/or a touch sensor placed on the display 306.

The wireless LAN interface 308 is a communication interface used when the information terminal 300 is connected to a network in order to communicate with another apparatus.

The short-range communication unit 309 is an interface via which the information terminal 300 wirelessly communicates with another apparatus in accordance with a standard such as Bluetooth (registered trademark).

<4. Functional Configuration of MFP 200>

Figure 6:
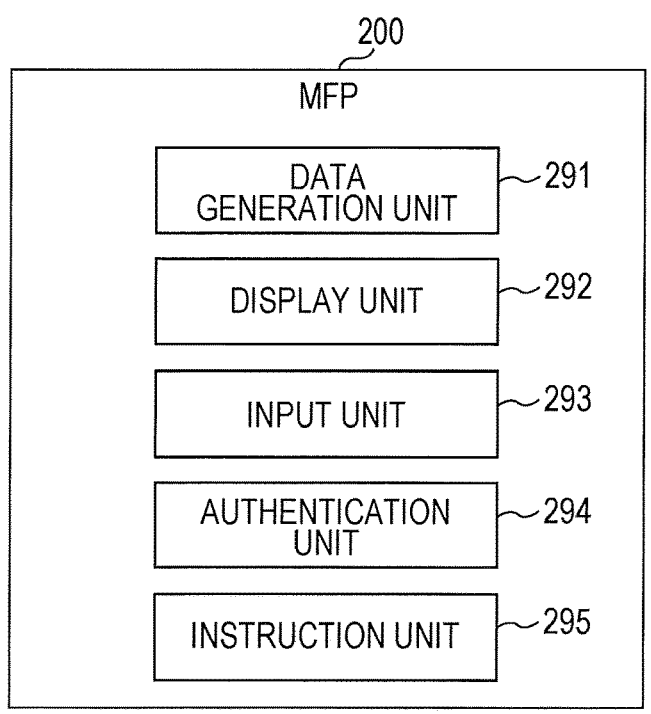
FIG. 6 shows an example of a functional configuration of an MFP.

FIG. 6 shows an example of a functional configuration of the MFP 200. As shown in FIG. 6, the MFP 200 includes a data generation unit 291, a display unit 292, an input unit 293, an authentication unit 294, and an instruction unit 295.

The data generation unit 291 generates image data of a manuscript and is realized by, for example, the scanner unit 208.

The display unit 292 displays information and is realized by, for example, a display of the operation panel 207 and the CPU 201.

The input unit 293 accepts input operation of information and is realized by, for example, a touch sensor of the operation panel 207.

The authentication unit 294 executes authentication of another apparatus and is realized by, for example, the CPU 201. The CPU 201 transmits/receives part of information to/from, for example, an apparatus authenticated by the authentication unit 294. In an example, the CPU 201 displays only a web page stored on an authenticated website (storage device) on the operation panel 207. In another example, the CPU 201 transmits data generated by the data generation unit 291 only to an authenticated communication apparatus. In still another example, only in a case where data is received from an authenticated communication apparatus, the CPU 201 causes the printer unit 209 to print an image of the data received from the apparatus.

The instruction unit 295 instructs the information terminal 300 to perform processing determined in advance and is realized by, for example, the CPU 201. The authentication unit 294 and the instruction unit 295 may be realized by executing the same application program or may be realized by executing different application programs.

<5. Functional Configuration of Information Terminal 300>

Figure 7:
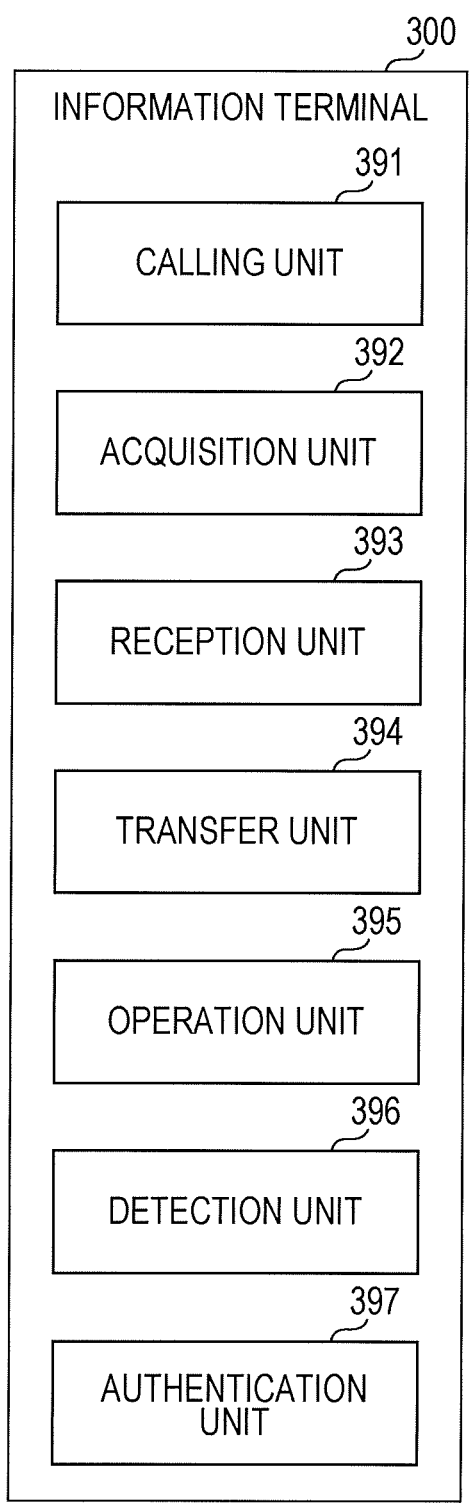
FIG. 7 shows an example of a functional configuration of an information terminal.

FIG. 7 shows an example of a functional configuration of the information terminal 300. As shown in FIG. 7, the information terminal 300 includes a calling unit 391, an acquisition unit 392, a reception unit 393, a transfer unit 394, an operation unit 395, a detection unit 396, and an authentication unit 397.

The calling unit 391 establishes a communication channel with another information terminal and is realized by, for example, the CPU 301 and the wireless LAN interface 308. An example of communication using the established communication channel is execution of a calling application. The communication may use a telephone line or may use a data line.

In this specification, execution of a calling application will be mainly described as a specific example of communication using an established communication channel. The communication using the established communication channel may be communication that does not use sound such as chat.

The acquisition unit 392 acquires MFP information from the MFP 200 and transmits the MFP information to another information terminal 300. The acquisition unit 392 is realized by, for example, the wireless LAN interface 308.

The reception unit 393 receives MFP information from another information terminal and is realized by, for example, the wireless LAN interface 308.

The transfer unit 394 transfers MFP information received by the reception unit 393 to the MFP 200 positioned on the periphery of the information terminal 300 and is realized by, for example, the wireless LAN interface 308.

The operation unit 395 accepts input operation and is realized by, for example, the input device 307.

The detection unit 396 detects that the MFP 200 is positioned on the periphery of the information terminal 300 and is realized by, for example, the short-range communication unit 309 and the CPU 301. In some cases, the detection unit 396 also detects that a target associated with the information terminal 300 (for example, user of information terminal 300) positions on the periphery of the MFP 200 and/or the target associated with the information terminal 300 has operated the MFP 200.

The authentication unit 397 executes processing for authenticating a user and/or an external apparatus and is realized by, for example, the CPU 301.

<6. Flow of Processing>

Figure 8:
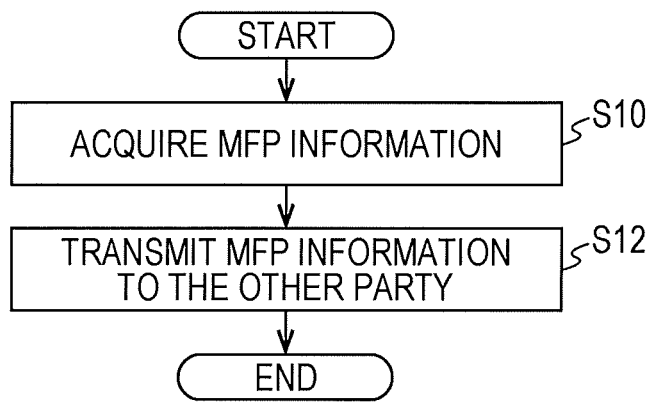
FIG. 8 is a flowchart showing an example of processing executed in an information terminal to transmit MFP information to the other party.

FIG. 8 is a flowchart showing an example of processing executed in the information terminal 300 to transmit MFP information to the other party. The processing in FIG. 8 is executed at, for example, the start of a call. The processing in FIG. 8 is realized as, for example, part of a calling application program installed in the information terminal 300. The processing in FIG. 8 may be realized by a program of an application different from the calling application.

As shown in FIG. 8, in Step S10, the CPU 301 acquires MFP information from the MFP 200 on the periphery of the information terminal 300. For example, the MFP 200 transmits the MFP information via a Bluetooth beacon, and the CPU 301 acquires the MFP information in such a manner that the reception unit 393 receives the MFP information. Thereafter, the control proceeds to Step S12.

In Step S10, the CPU 301 may acquire the MFP information in such a manner that a user manually input the MFP information to the information terminal 300. The CPU 301 may acquire the MFP information by requesting another device such as a server to transmit the MFP information of the MFP 200 positioned on the periphery of information terminal 300 and receiving the MFP information transmitted in response to the request.

In Step S12, the CPU 301 transmits the MFP information acquired in Step S10 to the other party. For example, in the example shown in FIG. 1, the other party of the first information terminal 300A is the second information terminal 300B. The other party of the second information terminal 300B is the first information terminal 300A. Thereafter, the processing in FIG. 8 is terminated.

In the image processing system of the first embodiment, upon receipt of MFP information from the other party, the CPU 301 of the information terminal 300 transmits the MFP information to the MFP 200 positioned on the periphery of the information terminal 300.

Upon receipt of the MFP information from the information terminal 300, the CPU 201 of the MFP 200 registers, in the storage device 205, an address contained in the MFP information as a candidate of a transmission destination of data. Thereafter, in the MFP 200, when an instruction to perform a copy is input, the CPU 201 displays the address registered as described above as a candidate of an output destination of data generated by performing the copy as shown in FIG. 3.

In the first embodiment described above, for example, the image processing system is configured by the second information terminal 300B and the second MFP 200B positioned in the second space SP2.

The calling unit 391 of the second information terminal 300B makes/receives a call to/from the first information terminal 300A. The reception unit 393 receives, from the first information terminal 300A, MFP information containing an address of the MFP 200 positioned on the periphery of the first information terminal 300A. The transfer unit 394 transfers the MFP information of the MFP 200 positioned on the periphery of the first information terminal 300A to the second MFP 200B positioned on the periphery of the second information terminal 300B.

As shown in FIG. 3, in the second MFP 200B, the display unit 292 displays the first MFP 200A as a candidate of a transmission destination of data. In the second information terminal 300B, the transfer unit 394 transfers the first MFP information to the second MFP 200B when, for example, the calling unit 391 establishes a communication channel with the first information terminal 300A.

Second Embodiment

A configuration of an image processing system in a second embodiment may be similar to that in the first embodiment. A hardware configuration and a functional configuration of the MFP 200 may be similar to those in the first embodiment. A hardware configuration and a functional configuration of the information terminal 300 may be similar to those in the first embodiment.

In the first embodiment, the CPU 301 of the information terminal 300 transmits MFP information to the other party at the start of a call as described above with reference to FIG. 8. In the second embodiment, the CPU 301 transmits MFP information to the other party, in addition to at the start of a call or instead of at the start of a call, at the time when the CPU 301 detects that the information terminal 300 is positioned on the periphery of the MFP 200.

Figure 9:
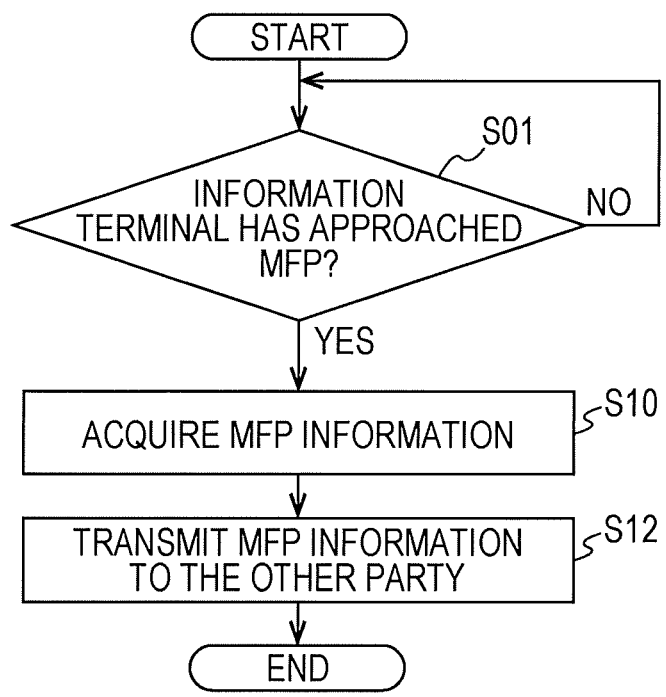
FIG. 9 is a flowchart showing a modification example of the processing in FIG. 8.

FIG. 9 is a flowchart showing a modification example of the processing in FIG. 8. As shown in FIG. 9, in the second embodiment, in Step S01, the CPU 301 determines whether or not the information terminal 300 has approached the MFP 200 after the start of a call. In a case where, for example, the CPU 301 detects a Bluetooth beacon from the MFP 200, the CPU 301 determines that the information terminal 300 has approached the MFP 200. On the condition that the CPU 301 detects that the information terminal 300 has approached the MFP 200 (YES in Step S01), the CPU 301 causes the control to proceed to Step S10.

Thereafter, the CPU 301 acquires MFP information from the MFP 200 positioned on the periphery of the information terminal 300 in Step S10 and transmits the MFP information to the other party in Step S20.

In the second embodiment, a circumstance in which the information terminal 300 has approached the MFP 200 is an example where the information terminal 300 is positioned "on the periphery of" the MFP 200.

According to the processing shown in FIG. 9, the information terminal 300 of the second embodiment transmits MFP information to the other party on the condition that the information terminal 300 is positioned on the periphery of the MFP 200. Further, in the second embodiment, the information terminal 300 may transmit the MFP information to the other party at the start of a call (when a communication channel is established to execute a calling application). An example of the above condition is that the information terminal 300 falls within a range communicable with the MFP 200, and another example thereof is that the information terminal 300 falls within a range determined in advance.

Third Embodiment

A configuration of an image processing system in a third embodiment may be similar to that in the first embodiment. A hardware configuration and a functional configuration of the MFP 200 may be similar to those in the first embodiment. A hardware configuration and a functional configuration of the information terminal 300 may be similar to those in the first embodiment.

In the third embodiment, the CPU 301 of the information terminal 300 transmits MFP information to the other party, in addition to at the start of a call or instead of at the start of a call, on the condition that the CPU 301 detects that a user associated with the information terminal 300 positions on the periphery of the MFP 200.

In the third embodiment, the MFP 200 includes a motion sensor as an example of an element for detecting a user. Each user carries an IC tag. The IC tag stores an ID of each user. When the IC tag is positioned on the periphery of the MFP 200 and the motion sensor of the MFP 200 detects the IC tag, the CPU 201 of the MFP 200 reads the ID stored on the IC tag and transmits the ID via a Bluetooth beacon.

The CPU 301 of the information terminal 300 determines whether or not the ID contained in the Bluetooth beacon transmitted from the MFP 200 is matched with an ID of a user of the information terminal 300 stored on the storage device 303. When the CPU 301 determines that the ID contained in the Bluetooth beacon is matched with the ID of the user of the information terminal 300, the CPU 301 transmits, to the other party, MFP information of the MFP 200 that is a transmission source of the Bluetooth beacon.

In the third embodiment, the system using an IC tag and a Bluetooth beacon is merely an example of a mode for detecting a user. Positioning of a user on the periphery of the MFP 200 may be detected in another mode.

In the third embodiment, the user of the information terminal 300 is an example of the target associated with the information terminal 300.

The target associated with the information terminal 300 may be a person other than the user of the information terminal 300, such as a subordinate of the user of the information terminal 300. In this case, in the image processing system described with reference to FIG. 1 and FIG. 2, the first information terminal 300A transmits the first MFP information to the second MFP 200B in response to the approach of the subordinate of the first user 100A to the first MFP 200A. In a case where the second user 100B transmits data from the second MFP 200B to the first MFP 200A, the first MFP 200A outputs the data and the above subordinate delivers the data output in the first MFP 200A (for example, sheet of paper on which data is printed) to the first user 100A. Further, the "target" associated with the information terminal 300 does not need to be a person. The target may be an apparatus associated with the user, such as a robot possessed by the user of the information terminal 300.

Fourth Embodiment

A configuration of an image processing system in a fourth embodiment may be similar to that in the first embodiment. A hardware configuration and a functional configuration of the MFP 200 may be similar to those in the first embodiment. A hardware configuration and a functional configuration of the information terminal 300 may be similar to those in the first embodiment.

In the fourth embodiment, the CPU 301 transmits MFP information to the MFP 200, in addition to at the start of a call or instead of at the start of a call, when the CPU 301 detects that a user associated with the information terminal 300 has operated the MFP 200.

In the fourth embodiment, the MFP 200 is operated in a public mode in which user authentication is unnecessary to perform operation and a non-public mode in which user authentication is necessary to perform operation. When the CPU 201 of the MFP 200 authenticates a user in the non-public mode, the CPU 201 transmits an ID of the user via a Bluetooth beacon.

The CPU 301 of the information terminal 300 determines whether or not the ID contained in the Bluetooth beacon transmitted from the MFP 200 is matched with an ID of a user of the information terminal 300 stored on the storage device 303. When the CPU 301 determines that the ID contained in the Bluetooth beacon is matched with the ID of the user of the information terminal 300, the CPU 301 transmits, to the information terminal 300 of the other party, MFP information received from the MFP 200 that is a transmission source of the Bluetooth beacon.

In the fourth embodiment, the user of the information terminal 300 is an example of the target associated with the information terminal 300. The target associated with the information terminal 300 may be a person other than the user of the information terminal 300 or may be an apparatus associated with the user of the information terminal 300.

Fifth Embodiment

A configuration of an image processing system in a fifth embodiment may be similar to that in the first embodiment. A hardware configuration and a functional configuration of the MFP 200 may be similar to those in the first embodiment. A hardware configuration and a functional configuration of the information terminal 300 may be similar to those in the first embodiment.

In the fifth embodiment, the CPU 301 transmits MFP information to the other party on the condition that a user performs explicit operation in the information terminal 300.

Figure 10:
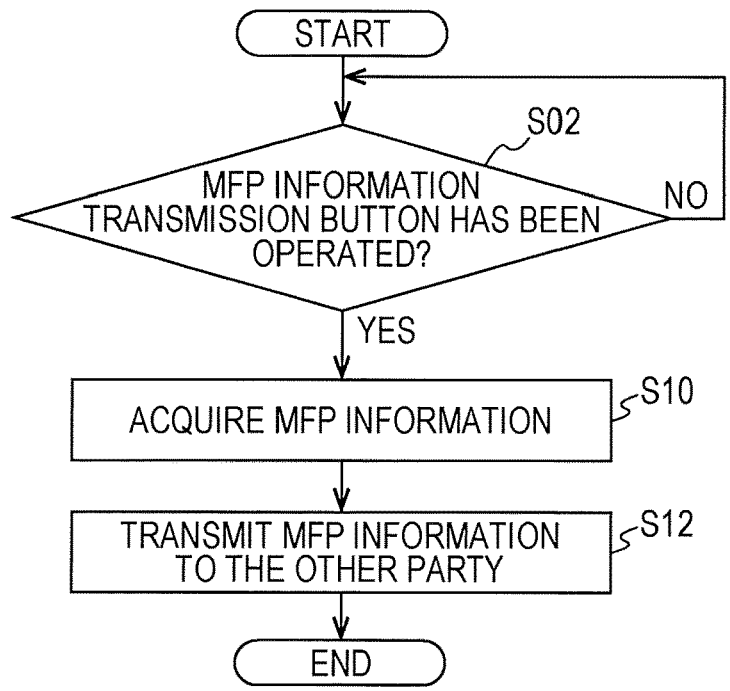
FIG. 10 is a flowchart showing a modification example of the processing in FIG. 8.
Figure 11:
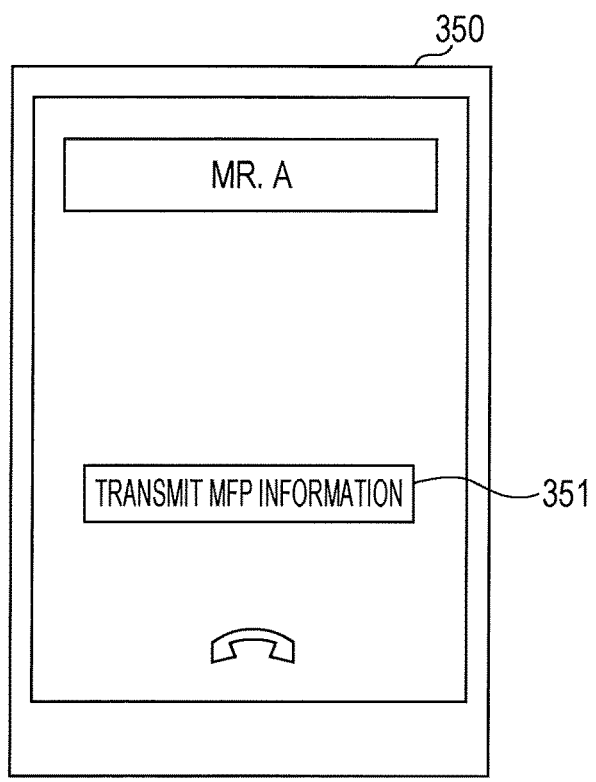
FIG. 11 shows an example of a screen displayed on an information terminal during a call.

FIG. 10 is a flowchart showing a modification example of the processing in FIG. 8. In the processing shown in FIG. 10, in Step S02, the CPU 301 determines whether or not an MFP information transmission button has been operated during a call. The MFP information transmission button is an example of a button displayed on the information terminal 300 during a call. FIG. 11 shows an example of a screen displayed on the information terminal 300 during a call.

The CPU 301 displays, for example, a screen 350 in FIG. 11 on the display 306 during a call. The screen 350 displays a name of the other party ("Mr. A" in FIG. 11) and an MFP information transmission button 351. The MFP information transmission button 351 is operated to instruct that MFP information be acquired and the MFP information be transmitted to the other party.

In the fifth embodiment, the information terminal 300 transmits MFP information to the other party in accordance with an explicit instruction, i.e., operation of the MFP information transmission button 351.

Sixth Embodiment

<1. Outline of Image Processing System>

In a sixth embodiment, a hardware configuration of the MFP 200 and a hardware configuration of the information terminal 300 may be similar to those in the first embodiment.

Figure 12:
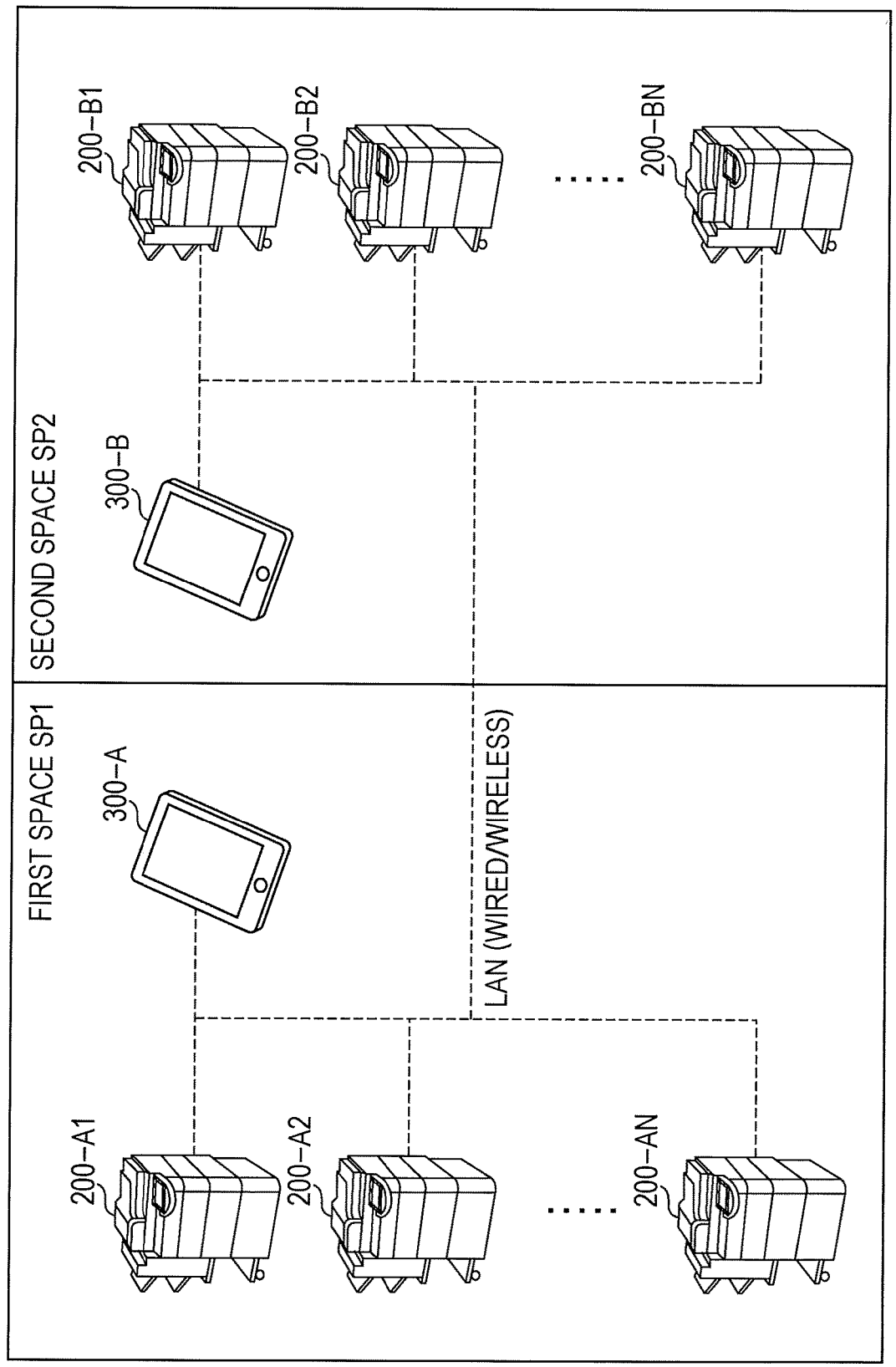
FIG. 12 shows an example of a schematic configuration of an image processing system according to a sixth embodiment.

In an image processing system in the sixth embodiment, two or more MFPs 200 exist on the periphery of a single information terminal 300. FIG. 12 shows an example of a schematic configuration of the image processing system in the sixth embodiment. In the image processing system shown in FIG. 12, an information terminal 300-A and N MFPs 200-A1 to 200-AN exist in the first space SP1. The information terminal 300-B and M MFPs 200-B1 to 200-BM exist in the second space SP2.

In the sixth embodiment, the information terminal 300 (for example, information terminal 300-A) transmits MFP information of a plurality of MFPs 200 (at least one of MFPs 200-A1 to 200-AN) positioned on the periphery of the information terminal 300 to the other party (for example, information terminal 300-B). The information terminal 300 (for example, information terminal 300-B) transfers the MFP information of the plurality of MFPs 200 to the MFP 200 (at least one of MFPs 200-B1 to 200-BM).

The transferred MFP information contains the order of priority. When the MFP 200 (at least one of MFPs 200-B1 to 200-BM) that has received the MFP information of the plurality of MFPs is instructed to copy a manuscript, the MFP 200 displays the MFPs corresponding to pieces of the MFP information as output destinations of a copied image in a mode based on the order of priority.

According to the sixth embodiment, in the image processing system shown in FIG. 12, for example, the information terminal 300-A sets the order of priority to the MFPs 200-A1 to 200-AN and transmits the order of priority to the information terminal 300-B. The information terminal 300-B transfers the order of priority received from the information terminal 300-A to, for example, the MFP 200-B1. When the MFP 200-B1 is instructed to copy a manuscript, the MFP 200-B1 displays the MFPs 200-A1 to 200-AN in a mode based on the order of priority as output destinations of a copied image.

<2. Functional Configuration of MFP 200>

Figure 13:
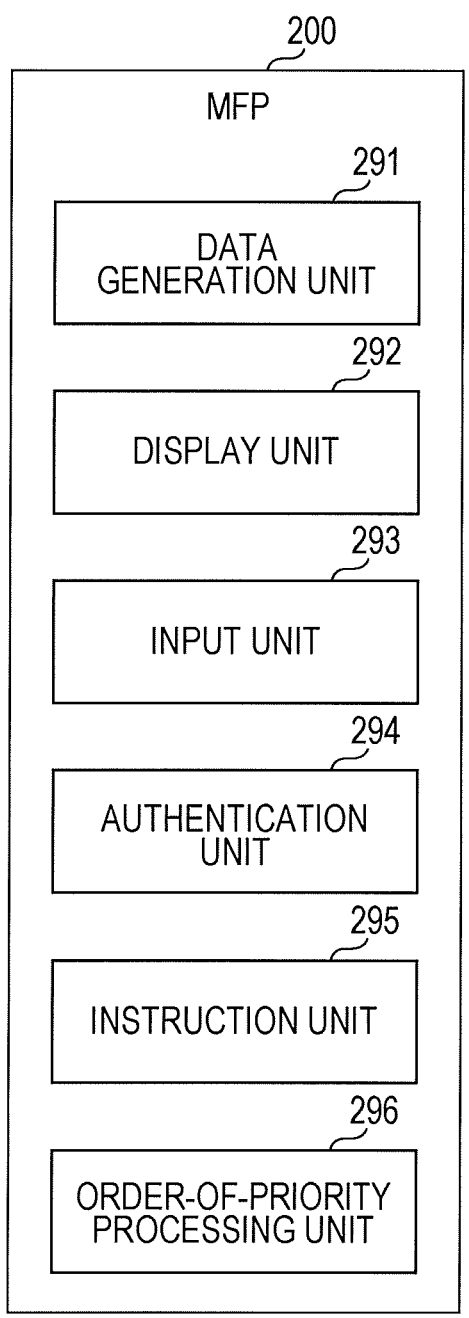
FIG. 13 shows an example of a functional configuration of an MFP according to the sixth embodiment.

FIG. 13 shows an example of a functional configuration of the MFP 200 in the sixth embodiment. As compared to the configuration shown in FIG. 6, the MFP 200 of the sixth embodiment further includes an order-of-priority processing unit 296.

In a case where the order-of-priority processing unit 296 receives MFP information of the plurality of MFPs 200, the order-of-priority processing unit 296 displays the MFPs 200 as candidates of a transmission destination of an image in a mode based on the order of priority thereof. The order-of-priority processing unit 296 is realized by, for example, the CPU 201.

Figure 14:
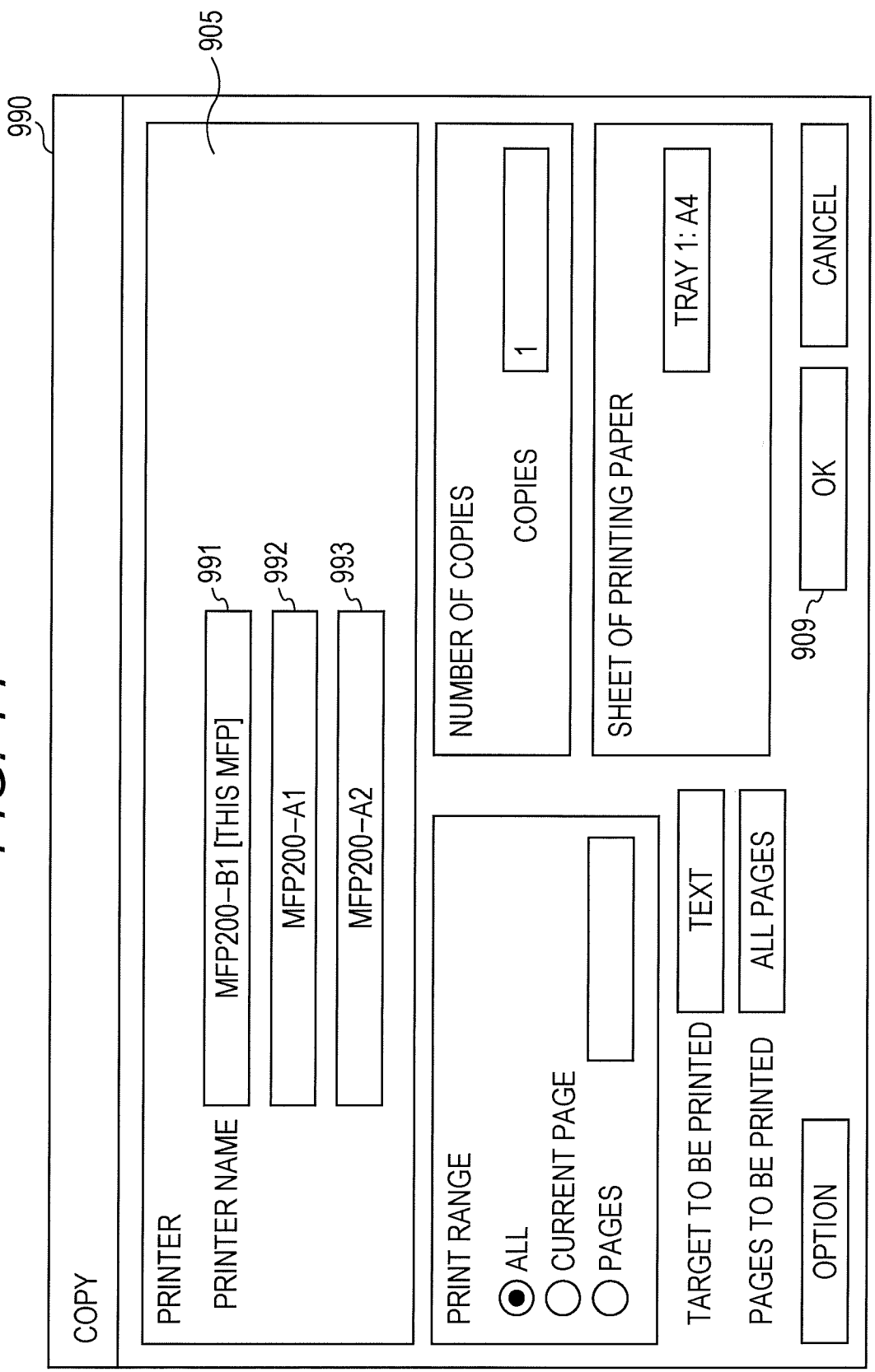
FIG. 14 shows an example of a screen displayed by the MFP that has received MFP information according to the sixth embodiment.

FIG. 14 shows an example of a screen displayed by the MFP 200 that has received MFP information in the sixth embodiment. In the image processing system of the sixth embodiment, for example, the information terminal 300-A acquires MFP information from the MFP 200-A1 and the MFP 200-A2 and transmits the MFP information thereof to the information terminal 300-B. The information terminal 300-B transfers the MFP information transmitted from the information terminal 300-A to the MFP 200-B1. When the MFP 200-B1 is instructed to copy a manuscript, the MFP 200-B1 displays not only the MFP 200-B1 but also the MFP 200-A1 and the MFP 200-A2 as candidates of an output destination of a copied image.

The display section 905 on a screen 990 in FIG. 14 displays a button 991 indicating "MFP 200-B1", a button 992 indicating "MFP 200-A1", and a button 993 indicating "MFP 200-A2" as the candidates of the output destination. The button 991 indicates the MFP 200-B1 itself that displays the button 991. Therefore, the button 991 includes a character string "This MFP".

In the sixth embodiment, in the information terminal 300-B, the MFP 200-A1 has a higher priority than the MFP 200-A2. This is shown by the fact that, on the screen 990, the button 992 indicating "MFP 200-A1" is displayed at a position higher than that of the button 993 indicating "MFP 200-A2".

<3. Functional Configuration of Information Terminal 300>

Figure 15:
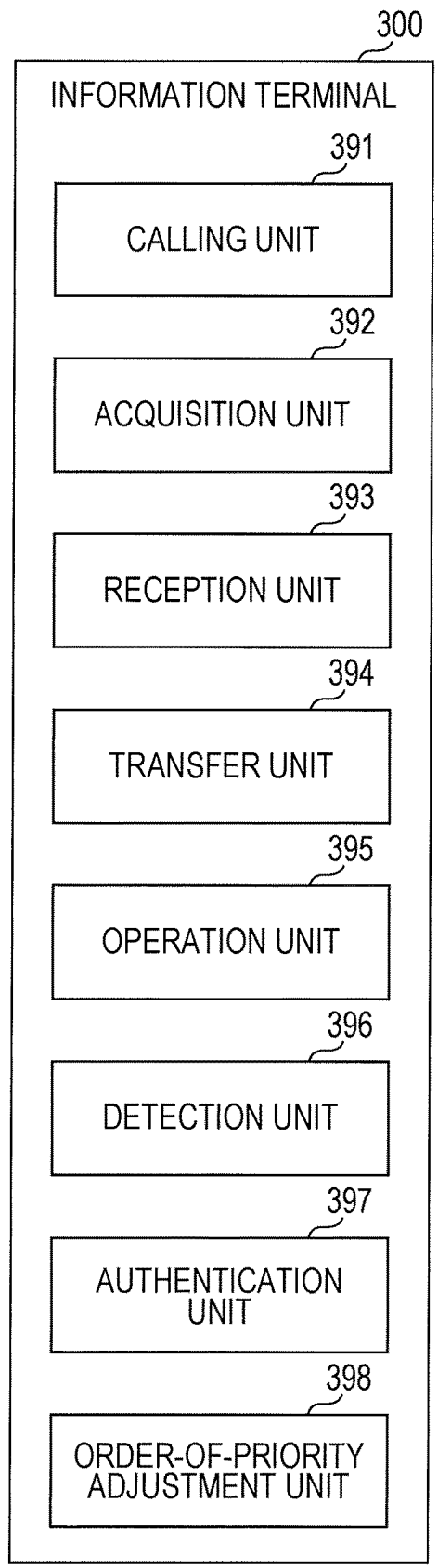
FIG. 15 shows an example of a functional configuration of an information terminal according to the sixth embodiment.

FIG. 15 shows an example of a functional configuration of the information terminal 300 in the sixth embodiment. As compared to the configuration shown in FIG. 7, the information terminal 300 in the sixth embodiment includes an order-of-priority adjustment unit 398. When MFP information of two or more MFPs 200 is acquired, the order-of-priority adjustment unit 398 sets the order of priority to each MFP 200.

The order-of-priority adjustment unit 398 sets the order of priority in accordance with, for example, a distance between the information terminal 300 and each MFP 200. In an example, the order-of-priority adjustment unit 398 sets a higher priority to the MFP 200 closer to the information terminal 300.

The order-of-priority adjustment unit 398 may set the order of priority to the plurality of MFPs 200 in accordance with a usage frequency of a user of the information terminal 300. In an example, a server in a network including the information terminal 300 and the plurality of MFPs 200 stores the number of times in which each user logs in each MFP 200. The order-of-priority adjustment unit 398 acquires, from the above server, the number of times in which a user associated with the information terminal 300 (for example, possessor of information terminal 300) has logged in each MFP 200 and sets a higher priority to the MFP 200 in which the user has logged more frequently.

The information terminal 300 may set the order of priority to each MFP 200 by combining a plurality of conditions such as a distance and a usage frequency.

<4. Flow of Processing>

Figure 16:
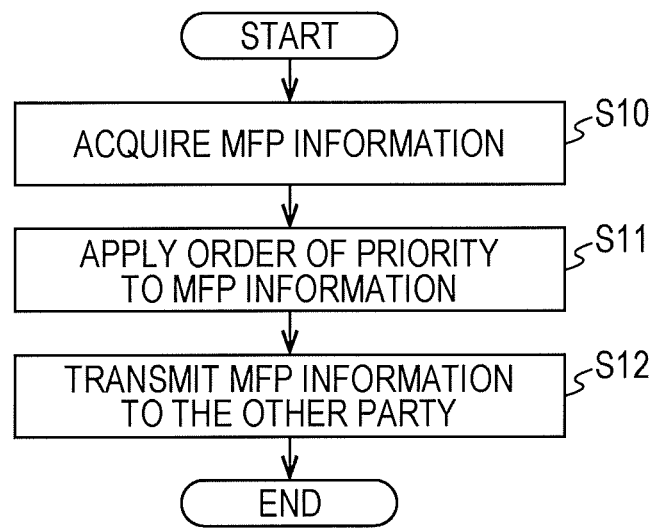
FIG. 16 is a flowchart showing an example of processing executed in the information terminal according to the sixth embodiment.

FIG. 16 is a flowchart showing an example of processing executed in the information terminal 300 in the sixth embodiment.

The processing shown in FIG. 16 further includes control in Step S11, as compared to the processing shown in FIG. 8. That is, in the processing in FIG. 16, the CPU 301 acquires MFP information (from each of two or more MFPs 200) in Step S10, and then the control proceeds to Step S11.

In Step S11, the CPU 301 sets the order of priority to each piece of the MFP information acquired in Step S10. More specifically, the CPU 301 sets the order of priority to each of the two or more MFPs 200 whose MFP information has been acquired in Step S10. Thereafter, the control proceeds to Step S12.

In Step S12, the CPU 301 transmits, to the other party, the plurality of pieces of MFP information together with the order of priority set to the MFPs 200 corresponding to the pieces of the MFP information. Thereafter, the processing in FIG. 16 is terminated.

In the sixth embodiment described above, in a case where the information terminal 300-B acquires MFP information of two or more MFPs (MFPs 200-A1 and 200-A2) from the information terminal 300-A of the other party, the information terminal 300-B transfers the MFP information to the MFP 200-B and further transmits, to the MFP 200-B, information that specifies the order of priority corresponding to each piece of the MFP information. As described above with reference to FIG. 14, when the MFP 200-B is instructed to perform a copy, the MFP 200-B displays, as candidates of an output destination of a copied image, the MFP 200-B and the MFPs (MFP 200-A1 and 200-A2) specified on the basis of the MFP information transmitted from the information terminal 300-B. Display modes of the MFPs serving as the candidates may correspond to the order of priority set to the respective MFPs.

<5. Modification example>

In the sixth embodiment, when the information terminal 300-A acquires MFP information from a plurality of MFPs (MFPs 200-A1 and 200-A2), the information terminal 300-A sets the order of priority to each of the plurality of MFPs on the basis of, for example, a distance between the information terminal 300-A and each MFP and transmits the MFP information and the order of priority to the other party (information terminal 300-B). A terminal that sets the order of priority may be the information terminal 300-B to which the MFP information is transmitted.

In this case, when the information terminal 300-A transmits the MFP information to the information terminal 300-B, the information terminal 300-B acquires information for setting the order of priority. An example of the information for setting the order of priority is information that specifies a distance between the information terminal 300-A and each MFP (for example, radio wave intensity of signal transmitted from MFP), the information being transmitted from the information terminal 300-A. Another example is position information of the information terminal 300-A and each MFP, the position information being stored on a server. Still another example is the number of times in which the user of the information terminal 300-A logs in each MFP, the number of times being stored on a server. By using the information, the information terminal 300-B sets the order of priority to the MFPs corresponding to the plurality of pieces of MFP information transmitted from the information terminal 300-A. The information terminal 300-B transfers the MFP information transmitted from the information terminal 300-A to the MFP 200-B1 and transmits the order of priority set to each MFP to the MFP 200-B1.

Seventh Embodiment

A configuration of an image processing system in a seventh embodiment may be similar to that in the sixth embodiment. A hardware configuration and a functional configuration of the MFP 200 may be similar to those in the sixth embodiment. A hardware configuration and a functional configuration of the information terminal 300 may be similar to those in the sixth embodiment.

In the image processing system of the seventh embodiment, upon receipt of MFP information, the MFP 200 adjusts the order of priority of the MFPs 200 specified based on pieces of the MFP information on the basis of formats of an image treated in MFPs 200 specified based on the pieces of the MFP information. That is, the MFP 200 adjusts the order of priority so that, among the MFPs 200 specified on the basis of the pieces of the MFP information, an MFP 200 that can treat the same image format as an image format that can be treated by the MFP 200 has a higher priority than an MFP 200 that cannot treat the image format. Thereafter, the MFP 200 reflects the order of priority that has been adjusted on a display for presenting the MFPs 200 specified on the basis of the pieces of the MFP information as output destinations of an image.

According to the seventh embodiment, in the image processing system shown in FIG. 12, for example, the information terminal 300-A sets the order of priority to the MFPs 200-A1 to 200-AN and transmits the order of priority to the information terminal 300-B. The information terminal 300-B transfers the order of priority received from the information terminal 300-A to, for example, the MFP 200-B1. The MFP 200-B1 adjusts the order of priority received from the information terminal 300-B in accordance with the kind of image format that can be treated by the MFP 200-B1. More specifically, the MFP 200-B1 adjusts the order of priority so that, among the MFPs 200-A1 to 200-AN, an MFP that can treat the same kind of image format as the kind of image format that can be treated by the MFP 200-B1 has a higher priority than an MFP that cannot treat the same kind of image format as the kind of the image format that can be treated by the MFP 200-B1. Thereafter, when the MFP 200-B1 is instructed to copy a manuscript, the MFP 200-B1 displays the MFPs 200-A1 to 200-AN as output destinations of a copied image in a mode based on the order of priority thereof.

Figure 17:
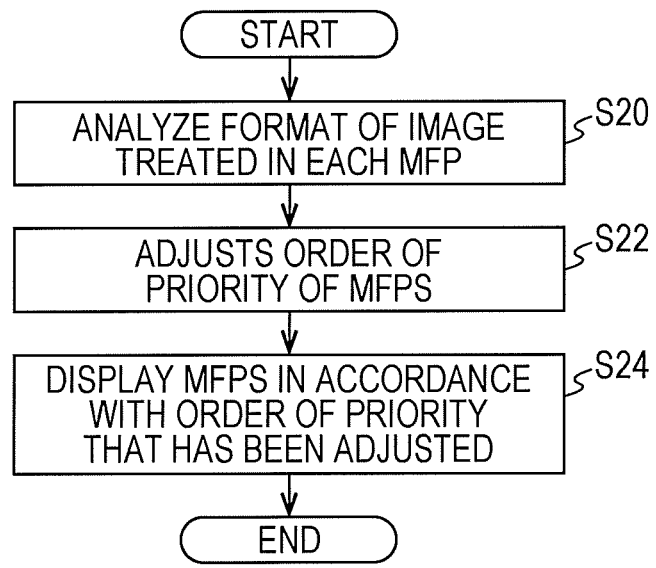
FIG. 17 is a flowchart showing an example of processing executed in an MFP of a seventh embodiment when MFP information is transmitted from an information terminal.

FIG. 17 is a flowchart showing an example of processing executed in the MFP 200 of the seventh embodiment when MFP information is transmitted from the information terminal 300.

As shown in FIG. 17, upon receipt of MFP information from the information terminal 300, in Step S20, the CPU 201 of the MFP 200 analyzes a format of an image treated in the MFP 200 specified on the basis of each piece of the MFP information transmitted from the information terminal 300. For example, the CPU 201 makes an inquiry to a server in the network and therefore specifies a model of the MFP 200 on the basis of the MFP information and specifies a format of an image treated in the model. The kind of format of an image that can be treated by the MFP may be written in the MFP information. In this case, the CPU 201 specifies a format of an image treated in the MFP 200 on the basis of the MFP information of the MFP 200. Thereafter, the control proceeds to Step S22.

In Step S22, the CPU 201 adjusts the order of priority of each MFP 200 transmitted from the information terminal 300 on the basis of a format of an image treated in each MFP 200. For example, the CPU 201 adjusts the order of priority so that an MFP 200 that can treat the same image format as an image format treated in the MFP 200 in which the CPU 201 is mounted has a higher priority than an MFP 200 that cannot treat the image format. Thereafter, the control proceeds to Step S24.

In Step S24, the CPU 201 displays the MFPs 200 corresponding to the pieces of the MFP information transmitted from the information terminal 300 as candidates of an output destination of an image in accordance with the order of priority that has been adjusted in Step S22. Thus; the processing shown in FIG. 17 is terminated.

Thereafter, the CPU 201 accepts designation of the output destination. The CPU 201 transmits an image of a manuscript generated by performing a copy to the MFP 200 designated as the output destination. However, in a case where the MFP 200 designated as the output destination does not treat an image format treated by the MFP 200 in which the CPU 201 is mounted, the CPU 201 does not transmit the image to the MFP 200 designated as the output destination. Instead, the CPU 201 transmits an instruction to convert the image format together with the above image to the information terminal 300 that has transmitted the MFP information to the MFP 200 in which the CPU 201 is mounted.

In the information terminal 300 that has received the above instruction and the above image, the CPU 301 converts the above image into a format treated in the MFP 200 designated as the output destination. Thereafter, the CPU 301 transmits the converted image to the MFP 200 designated as the output destination. The CPU 301 may transmit the converted image to the MFP 200 designated as the output destination via the information terminal 300 of the other party.

According to an embodiment of the present disclosure, an information terminal establishes a communication channel with another terminal for calling or the like, receives device information containing an address of an image processing device positioned on the periphery of the another terminal, and transmits the device information to an image processing device positioned on the periphery of the information terminal. With this, a user of the above information terminal can transmit data of a document to a user of the another terminal by using the image processing device positioned on the periphery thereof without interrupting a call. The user of the another terminal can cause the image processing device positioned on the periphery thereof to output the above data and can read a document of the data without interrupting the call.

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include any modifications within the meaning and scope equivalent to the claims. Further, the inventions described in the embodiments and the modification examples are intended to be implemented alone or in combination as much as possible.

What is claimed is:

1. An information terminal comprising:
   a calling unit configured to enable voice communication with another information terminal;
   a hardware processor configured to function as a:
   a communication unit; and
   a control unit to control the communication unit, wherein
   the control unit is configured to establish a communication channel with the another information terminal by using the communication unit, and
   the communication unit is configured to:
   receive device information containing an address of a first image processing device positioned on a periphery of the another information terminal from the another information terminal during a call between a first user of the information terminal and a second user of the another information terminal, and
   transmit the device information of the first image processing device positioned on the periphery of the another information terminal to a second image processing device positioned on the periphery of the information terminal,
   wherein:
   the communication unit is configured to, upon receipt of device information of a plurality of image processing devices from the another information terminal, transmit the device information of the plurality of image processing devices and an order of priority of the plurality of image processing devices to the image processing device positioned on the periphery of the information terminal, and
   the order of priority is based on at least one of a distance between the another information terminal and each of the plurality of image processing devices and a usage frequency of each of the plurality of image processing devices associated with the another information terminal.

2. The information terminal according to claim 1, wherein the communication unit
   is configured to receive the device information from the second image processing device positioned on the periphery of the information terminal and transmit, to the another information terminal, the device information of the second image processing device positioned on the periphery of the information terminal, and
   is configured to transmit, to the another information terminal, the device information of the second image processing device positioned on the periphery of the information terminal when the communication channel with the another information terminal is established.

3. The information terminal according to claim 1, wherein
   the control unit is configured to detect that the information terminal or a target associated with the information terminal is positioned on the periphery of the second image processing device, or the target associated with the information terminal has operated the second image processing device, and
   the communication unit is configured to, in a case where the control unit detects that the information terminal or the target associated with the information terminal is positioned on the periphery of the second image processing device, or the target associated with the information terminal has operated the second image processing device, transmit the device information of the first image processing device positioned on the periphery of the another terminal to the second image processing device.

4. The information terminal according to claim 1, further comprising an operation unit configured to accept an input, wherein
   the control unit is configured to, in a case where an instruction to transfer the device information is input to the operation unit, transmit the device information of the second image processing device positioned on the periphery of the information terminal to the another information terminal.

5. The information terminal according to claim 1, wherein the communication unit is further configured to receive the device information containing an address of the second image processing device positioned on the periphery of the information terminal from the second image processing device.

6. The information terminal according to claim 1, wherein the communication unit is configured to:
   receive the device information containing the address of the first image processing device directly from the another information terminal, and
   transmit the device information of the first image processing device directly to the second image processing device.

7. The information terminal according to claim 1, further comprising means for instructing the second image processing device to transmit data to the first image processing device.

8. An image processing system comprising:
   an information terminal including a calling unit configured to enable voice communication with another information terminal; and
   a second image processing device positioned on a periphery of the information terminal, wherein
   the information terminal includes a hardware processor configured to function as a communication unit and a control unit to control the communication unit,
   the control unit is configured to establish a direct communication channel with the another information terminal by using the communication unit, and the communication unit is configured to receive device information containing an address of a first image processing device positioned on the periphery of the another information terminal during a call between a first user of the information terminal and a second user of the another information terminal, and transmit the device information of the first image processing device directly to the second image processing device;

wherein:

the communication unit is configured to receive the device information containing an address of a plurality of image processing devices positioned on the periphery of the another information terminal;

the device information of the plurality of image processing devices contains a kind and an order of priority of data treated by the plurality of image processing devices, the second image processing device includes a display unit; and a second hardware processor configured to function as:

a generation unit configured to generate an image data, the display unit is configured to display the plurality of image processing devices as candidates of a transmission destination of the image data generated by the generation unit, and an adjustment unit configured to adjust the order of priority of the plurality of image processing devices, and the adjustment unit is configured to adjust the order of priority of the plurality of image processing devices so that one of the plurality of image processing devices corresponding to the device information that does not contain the kind of the image data generated by the generation unit has a lower priority than another of the plurality of image processing devices corresponding to the device information that contains the kind of the image data generated by the generation unit.

9. The image processing system according to claim 8, wherein the device information contains information for specifying the kind of image data treated by the first image processing device, and the second hardware processor is further configured to function as:

an input unit configured to accept input, and a transmission unit to, in a case where the input unit accepts an instruction to transmit the image data to the first image processing device and the kind of image data to be transmitted is not included in the kind of image data treated by the first image processing device, transmit, to the information terminal, an instruction to convert the image data to be transmitted in response to the instruction into the kind of image data treated by the first image processing device and then transmit the image data to the first image processing device.

10. The image processing system according to claim 8, wherein the control unit is configured to establish the direct communication channel with the another information terminal by using the communication unit, and the communication unit is configured to transmit the device information of the first image processing device directly to the second image processing device.

11. The image processing system according to claim 8, wherein the information terminal further includes means for instructing the second image processing device to transmit data to the first image processing device.

12. A non-transitory recording medium storing a computer readable program executed by a computer of an information terminal including a calling unit configured to enable voice communication with another information terminal and a communication unit, the program causing the computer to execute:

a step of establishing a communication channel with the another information terminal by using the communication unit;

a step of receiving device information containing an address of a first image processing device positioned on a periphery of the another information terminal during a call between a first user of the information terminal and a second user of the another information terminal; and a step of transmitting the device information of the first image processing device positioned on the periphery of the another information terminal to a second image processing device positioned on the periphery of the information terminal. wherein:

upon receipt of device information of a plurality of image processing devices from the another information terminal, transmit the device information of the plurality of image processing devices and an order of priority of the plurality of image processing devices to the second image processing device positioned on the periphery of the information terminal, and the order of priority is based on at least one of a distance between the another terminal and each of the plurality of image processing devices and a usage frequency of each of the plurality of image processing devices associated with the another information terminal.

13. The non-transitory recording medium according to claim 12, wherein the program causing the computer to execute:

a step of establishing a direct communication channel with the another information terminal by using the communication unit; and a step of transmitting the device information of the first image processing device directly to the second image processing device.

14. The non-transitory recording medium according to claim 12, wherein the program further causes the computer to instruct the second image processing device to transmit data to the first image processing device.

* * * * *